United States Patent
Koehler et al.

(10) Patent No.: US 10,207,518 B2
(45) Date of Patent: Feb. 19, 2019

(54) METHOD FOR COMPENSATING FOR FAILED PRINTING NOZZLES IN AN INKJET PRINTING MACHINE BY USING DEVIATING NOZZLES

(71) Applicant: HEIDELBERGER DRUCKMASCHINEN AG, Heidelberg (DE)

(72) Inventors: Hans Koehler, Edingen-Neckarhausen (DE); Ralf Tita, Hirschhorn (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/632,603

(22) Filed: Jun. 26, 2017

(65) Prior Publication Data
US 2017/0368839 A1    Dec. 28, 2017

(30) Foreign Application Priority Data
Jun. 28, 2016   (DE) ........................ 10 2016 211 578

(51) Int. Cl.
*B41J 2/21* (2006.01)
*B41J 2/045* (2006.01)
*B41J 2/165* (2006.01)
*B41J 2/01* (2006.01)
*B41J 29/38* (2006.01)
*B41J 29/393* (2006.01)
*G06K 15/10* (2006.01)

(52) U.S. Cl.
CPC .......... *B41J 2/2142* (2013.01); *B41J 2/0451* (2013.01); *B41J 2/16579* (2013.01); *B41J 2/2139* (2013.01); *B41J 2/2146* (2013.01); *B41J 2/01* (2013.01); *B41J 29/38* (2013.01); *B41J 29/393* (2013.01); *G06K 15/10* (2013.01)

(58) Field of Classification Search
CPC ...... B41J 2/2142; B41J 2/0451; B41J 2/2139; B41J 2/2146; B41J 2/16579; B41J 29/393; B41J 2/01; B41J 29/38; G06K 15/10
See application file for complete search history.

(56) References Cited

U.S. PATENT DOCUMENTS

| | | |
|---|---|---|
| 6,354,689 B1 | 3/2002 | Couwenhoven et al. |
| 7,407,264 B2 | 8/2008 | Kuwahara et al. |

(Continued)

*Primary Examiner* — Henok Legesse
(74) *Attorney, Agent, or Firm* — Laurence A. Greenberg; Werner H. Stemer; Ralph E. Locher

(57) ABSTRACT

A method for compensating for failed printing nozzles in an inkjet printing machine uses a computer to provide an increased ink drop volume of adjacent nozzles. All existing printing nozzles are measured regarding print failure and deviation of a printed dot beyond a specific threshold, so that the printing nozzles are marked either as functioning, failed, or printing a dot deviating in a direction transverse to the printing direction, and the results are saved on the computer. The computer hides all functioning printing nozzles and marks all remaining isolated printing nozzles as failed nozzles. The computer groups adjacent remaining printing nozzles by marking nozzles printing a dot deviating in a direction transverse to the printing direction as functioning printing nozzles contributing to the compensation or as failed printing nozzles in accordance with a rule, and the computer compensates for all printing nozzles having been marked as failed.

9 Claims, 3 Drawing Sheets

(56) References Cited

U.S. PATENT DOCUMENTS 8,567,896 B2   10/2013  Ueshima
2006/0125850 A1   6/2006  Kim et al.
2015/0375503 A1* 12/2015  Sato .................. B41J 2/2139
                                              347/9

* cited by examiner

METHOD FOR COMPENSATING FOR FAILED PRINTING NOZZLES IN AN INKJET PRINTING MACHINE BY USING DEVIATING NOZZLES

CROSS-REFERENCE TO RELATED APPLICATION

This application claims the priority, under 35 U.S.C. § 119, of German Patent Application DE 10 2016 211 578.2, filed Jun. 28, 2016; the prior application is herewith incorporated by reference in its entirety.

BACKGROUND OF THE INVENTION

Field of the Invention

The invention relates to a method for compensating for failed printing nozzles in an inkjet printing machine, wherein printing nozzles that print in a deviating way are used for compensation in a supportive way.

The technical field of the invention is the field of digital printing.

Inkjet printing machines in general include one or more print heads each of which includes a plurality of printing nozzles. The inkjet printing machines use the nozzles for printing by expelling ink. Those printing machines have nozzles plates with specific configurations of the individual nozzles. A failure of an individual nozzle results in regions in the individual color separation that cannot be imaged by the dedicated nozzle, creating colorless regions that may become visible as white lines. In a multicolor print, the corresponding color is missing at that location and the color values are distorted. Other facts that need to be taken into account are that the ejection path of an individual nozzle may not be the ideal one but may deviate from the ideal path to a greater or lesser extent and the size of a jetted dot. Thus, a malfunctioning nozzle affects the quality of every printed document inasmuch as the relevant nozzle contributes to the print result. There are various reasons for a failure of individual nozzles and a failure may be temporary or permanent.

A number of compensatory approaches have become known in the art in order to reduce the effects, in particular on solid areas in the printed image.

One of those approaches is to compensate for failed printing nozzles by substituting the nozzles of other respective process colors being used in the same location for the failed printing nozzle. That process attempts to replace the failed process color as accurately as possible by overprinting the remaining available printing nozzles of the other process colors in a defined and controlled way. However, that approach is only possible in multicolor printing.

Another approach is to compensate for failed nozzles by creating redundancy of printing nozzles of the same color. That may be achieved by multi-line print heads that include a number of printing nozzles that may print on the same location in the print image or by the use of multiple print heads disposed in such a way as to ensure that every location on the printed printing substrate may be reached by multiple print heads. Disadvantages of that approach include increased structural complexity and higher maintenance and operational costs resulting from the increased amount of hardware, i.e. of multiple print heads or larger multi-line print heads as required to ensure redundancy.

The most common approach to compensate for failed printing nozzles is thus to actuate the printing nozzles adjacent a failed printing nozzle in such a way as to compensate for the failed adjacent printing nozzle by emitting drops of an increased volume. That actuation is a complex process. For instance, care needs to be taken to avoid overcompensation which, although causing the failed printing nozzle to be compensated for, would result in the use of too much ink by the adjacent printing nozzles, resulting in a black line caused by the increased use of ink instead of in a white line caused by the failed nozzle.

U.S. Patent Application Publication US 2006/0125850 A1 discloses a method and a printing machine that operate in accordance with that principle. However, the method has an effect on the printed image in that problems occur in particular when multiple directly adjacent nozzles fail. Compensation over two or multiple times the distance is hardly possible. Although that method for compensating for failed printing nozzles by increasing the ink drop volume of the adjacent printing nozzles works very well for individual failed printing nozzles, it reaches its limits when larger gaps occur, i.e. when two or even more directly adjacent nozzles fail, for instance.

Another aspect that exacerbates the problem is the definition of a failed nozzle, because nozzles that are marked as failed are frequently not completely out of operation but merely have a reduced printing performance or print in a way that deviates at an angle from their intended target printing location. In accordance with the prior art, such partly functioning printing nozzles are deactivated and compensated for like missing, failed printing nozzles. Such partly failed printing nozzles make up a large proportion of the printing nozzles that are officially indicated as defective. In addition, the phenomenon of failed printing nozzles is very often cumulative, i.e. it involves a failure of multiple directly adjacent nozzles. Thus, an advantage in terms of a clean and efficient printing process would be to reduce the number of failed printing nozzles in that those printing nozzles that are only partly failed need not be deactivated and instead may be used in the printing operation.

SUMMARY OF THE INVENTION

It is accordingly an object of the invention to provide a method for compensating for failed printing nozzles in an inkjet printing machine by using deviating nozzles, which overcomes the hereinafore-mentioned disadvantages of the heretofore-known methods of this general type by reducing the number of failed printing nozzles in the inkjet printing machine and providing improvements over the prior art in particular in terms of the compensation for adjacent failed nozzles.

With the foregoing and other objects in view there is provided, in accordance with the invention, a method for compensating for failed printing nozzles in an inkjet printing machine by using a computer wherein failed printing nozzles are compensated for by an increased ink drop volume of adjacent printing nozzles, the method comprising the following steps:

1. measuring all printing nozzles that are present in terms of a print failure and in terms of a deviation of the printed dot beyond a defined threshold, causing the printing nozzles to be marked either as functioning, failed, or printing in a deviating way, and saving the results on the computer;
2. hiding all functioning printing nozzles by using the computer;
3. marking all remaining isolated printing nozzles as failed nozzles by using the computer;

4. grouping adjacent remaining printing nozzles by using the computer, wherein printing nozzles that print in a deviating way are marked either as nozzles that are functioning and thus contributing to the compensation or as failed printing nozzles in accordance with a grouping rule; and 5. compensating for all printing nozzles that have been marked as failed by using the computer.

In the method of the invention, the two problem aspects of a failure of adjacent printing nozzles and of printing nozzles that print at an angle are combined in such a way as to use the one symptom to compensate for the other, ultimately resulting in a reduction of both problems. Thus, once all failed or deviating printing nozzles have been identified, an analysis is made to determine those among the printing nozzles printing at an angle that do not necessarily have to be deactivated—creating another defective nozzle—because they may instead be used to compensate for a printing nozzle that has truly failed. It goes without saying that isolated printing nozzles printing at an angle may not be used to compensate for truly failed nozzles. Thus, they are deactivated as proposed by the prior art and need to be compensated for as failed printing nozzles. However, if a number of failed nozzles and above all nozzles that print at an angle are disposed adjacent one another—a phenomenon that is relatively common in practice—it absolutely makes sense not to deactivate the printing nozzles that print at an angle because that would mean that they would then have to be compensated for, and instead to use them to compensate for an adjacent nozzle that has truly failed. For instance, in a case in which a printing nozzle printing at an angle towards the left is disposed to the right of a failed printing nozzle, it makes sense to use both the left-hand neighboring printing nozzle that prints normally and the printing nozzle that prints at an angle towards the left into the gap created by the failed nozzle to compensate for the failed printing nozzle. This provides a much better compensation result than if the nozzle that prints at an angle towards the left was deactivated because a deactivation would result in a situation in which the adjacent printing nozzles that function normally would have to compensate for a gap of two failed printing nozzles. In order to find out when such a scenario occurs and when such compensation makes sense, regular controls are required to measure the condition of the printing nozzles. The method that is used for this purpose is irrelevant to the method of the invention. It only needs to identify the printing nozzles that have failed, the deviating printing nozzles as well as the direction and magnitude of the deviation. These data are then compared to a grouping rule—a rule which needs to encompass all possible scenarios of failed and deviating printing nozzles. This automated comparison made by a computer allows the computer to easily identify the printing nozzles that print at an angle and may be used for compensation purposes and the printing nozzles that need to be deactivated as before in accordance with the prior art and subsequently likewise need to be compensated for.

Thus, another aspect of the invention is that the printing nozzles that print in a deviating way are printing nozzles that print at an angle in a direction transverse to the printing direction and are used to compensate for printing nozzles disposed adjacent them in a direction transverse to the printing direction and marked as failed. In practice, there are basically two scenarios for the printing nozzles that print in a deviating way: the deviating printing nozzle may either deviate to the left or to the right. In this context, the adjacent printing nozzles are usually disposed in a direction transverse to the printing direction. This ultimately means that the deviation of the printing nozzles may occur in a direction transverse to the printing direction, either to the left or to the right.

Advantageous and thus preferred further developments of the present invention will become apparent from the associated dependent claims as well as from the description and the associated drawings.

Another preferred development of the method of the invention in this context is that the printing nozzles that print in a deviating way print at an angle along the printing direction and are used to compensate for printing nozzles that are adjacent along the printing direction and have been marked as failed printing nozzles. Although printing nozzles that deviate to the left or to the right in a direction transverse to the printing direction clearly are the main application of the method of the invention, there are of course printing nozzles that deviate along the printing direction, i.e. in an upward or downward direction. These printing nozzles may likewise be used to compensate for failed printing nozzles in a case in which the failed adjacent printing nozzles are accordingly disposed along the printing direction. Since in practice the printing nozzles are disposed in printing rows in the inkjet print head, and since these printing rows are in general disposed in a direction perpendicular to the printing direction, such a case will be comparatively rare and mainly applies to print heads that include multiple rows of printing nozzles disposed on top of one another.

A further preferred development of the method of the invention in this context is that the adjacent remaining printing nozzles are grouped in accordance with a fixed table saved on the computer and used as a grouping rule. The best type of grouping rule has been found to be a fixed table that may be applied, for instance, as a fixed multilevel logic table saved on the computer. For a faster processing on the computer, the table may be available on the computer in any other digital form, for instance a matrix.

An added preferred development of the method of the invention in this context is that the fixed table as the grouping rule contains all possible combinations in groups of both two and three failed printing nozzles in a group that print at an angle transverse to and along the printing direction. As mentioned above, the grouping rule needs to contain all possible combinations that may occur of failed printing nozzles and printing nozzles that print in a deviating way either to the left, to the right, upwards, or downwards. Since a case in which more than three printing nozzles print in a deviating way or have failed is extremely rare, it is sufficient for almost all cases to provide a grouping rule in the form of a table that represents all possible combinations both for two adjacent printing nozzles that do not print correctly and for three adjacent printing nozzles that do not print correctly.

An additional preferred development of the method of the invention in this context is that if groups occur that include more than three printing nozzles that print at an angle in a direction transverse to or along the printing direction and printing nozzles that have failed, these groups are subdivided into smaller groups of two or three printing nozzles. Thus, if a case occurs in which a group of adjacent printing nozzles that do not print correctly contains more than three printing nozzles, this group may easily be split into smaller subgroups of two or three printing nozzles that do not function correctly, allowing the known fixed table containing the combination for two and three adjacent printing nozzles that do not print correctly to be applied to the subgroups. For instance, a group of four adjacent printing nozzles that print incorrectly would be divided into two subgroups of two deviating printing nozzles each and a group of five would be divided into two subgroups of two and three printing nozzles, respectively. An advantage of such a strategy is that the fixed table representing the grouping rule is suitably small and thus easier to apply, update, and administrate.

Yet another preferred development of the method of the invention in this context is that if groups occur that include more than three printing nozzles that print at an angle in a direction transverse to or along the printing direction and printing nozzles that have failed, new fixed tables for all possible combinations are created and used. An alternative strategy is to provide fixed tables even for groups of four or six or even more printing nozzles that have failed or print in a deviating way, ensuring that these fixed tables cover all possible combinations that may occur. This strategy is more accurate than the subdivision into smaller subgroups because it maintains a global view of this block of printing nozzles that print incorrectly. However, the high number of combinations makes the table very big and thus more cumbersome to administrate.

Yet a further preferred development of the method of the invention in this context is that the adjacent remaining printing nozzles are grouped by using an algorithm running on the computer as the grouping rule. An alternative to using a fixed table as a grouping rule to decide whether printing nozzles that print in a deviating way may be used for compensation purposes is the use of an algorithm that provides a corresponding output for occurring scenarios, i.e. combinations of adjacent nozzles that have failed or print in a deviating way, to decide which of the nozzles that print in a deviating way may be used for compensation purposes. An advantage of using an algorithm instead of a fixed table is that the algorithm covers all scenarios in one, e.g. even larger groups of adjacent printing nozzles that do not print correctly whereas in practice, the table will in most cases not cover all scenarios but rather envisages a subdivision of larger groups into smaller subgroups. An advantage of the table is, however, that it is efficient and concise. In addition, it is not dependent on an algorithm and values based on experience may be entered. For instance, if experience from practical use shows that the use of specific printing nozzles that print in a deviating way is the most efficient way of compensating for a specific combination of failed printing nozzles and printing nozzles that print in a deviating way, this may easily be entered into the table but would be very difficult to express in an algorithm.

Yet an added preferred development of the method of the invention in this context is that by measuring all available printing nozzles, a value of a numerically determined obliqueness is established and is factored in the table or algorithm used as the grouping rule and thus factored in the computer's decision on how to group the adjacent remaining printing nozzles. The degree of deviation, defined in the form of a numerical value, may thus not only be used as a threshold that defines whether a printing nozzle that prints at an angle is marked as deviating but also as a guiding value in the decision whether this printing nozzle that prints at an angle is at all suitable for being used to compensate for adjacent failed printing nozzles or whether it rather needs to be marked as failed itself and compensated for. A printing nozzle that only deviates slightly from its ideal print dot is of course much more frequently suitable for contributing to the compensation than a printing nozzle that deviates by multiple printing nozzle distances, even though the latter may have its uses, for instance in a case in which there coincidentally is a failed printing nozzle at this location.

A concomitant preferred development of the method of the invention in this context is that the dot size of the printing nozzles is varied by the computer as a function of a value of the numerically detected obliqueness of the printing nozzles. The size of the ink droplets with which a printing nozzle that prints in a deviating way contributes to the compensation is of course to be dependent on the value by which the printing nozzle deviates from its allocated print dot. For instance, if a printing nozzle that prints in a way deviating to the left is used to compensate for a failed printing nozzle disposed to the left next to the former, it should print with a greater ink drop volume if it hits exactly the print dot of the adjacent failed nozzle than if it prints beyond this print dot into the printing region of the printing nozzle disposed to the left next to the failed printing nozzle.

Other features which are considered as characteristic for the invention are set forth in the appended claims.

Although the invention is illustrated and described herein as embodied in a method for compensating for failed printing nozzles in an inkjet printing machine by using deviating nozzles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
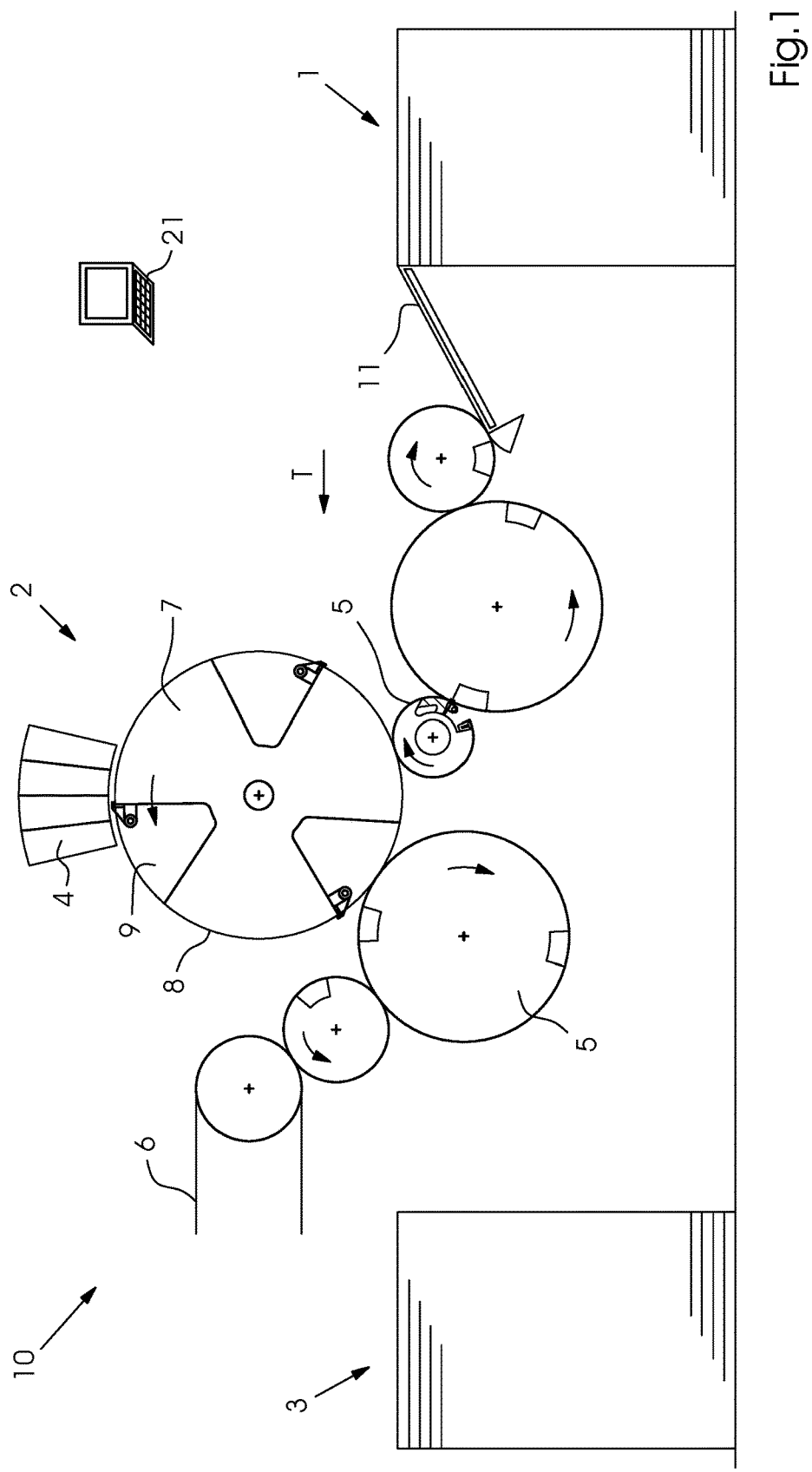
FIG. 1 is a diagrammatic, longitudinal-sectional view of an inkjet printing machine.
Figure 2:
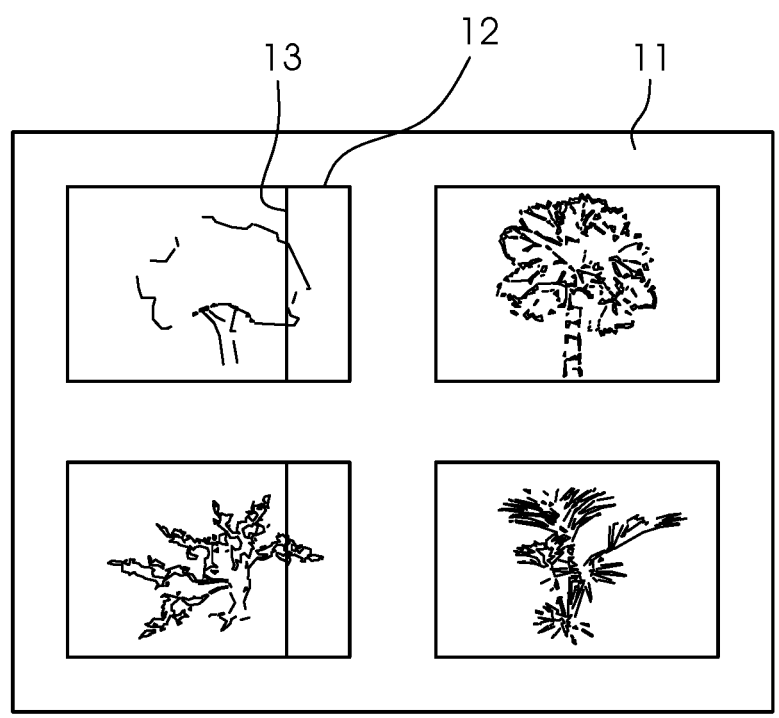
FIG. 2 is a plan view of a sheet with a representation of a white line resulting from a failed nozzle.

Referring now in detail to the figures of the drawings, in which mutually corresponding elements have the same reference symbols. and first, particularly, to FIG. 1 thereof, there is seen an illustration of an example of the structure of a sheet-fed printing machine 10. When this printing machine 10 is in operation, individual nozzles in inkjet print heads 4 in a printing unit 2 may fail as described above. Such a failure results in white lines 13 or, in the case of multicolor printing, in distorted color values. An example of such a white line 13 in a printed image 12 is shown in FIG. 2.

The printing operation is monitored by a control computer 21. A sheet 11 is transported in a direction of transport T from a feeder 1 over a transfer cylinder 5 to a printing cylinder or jetting cylinder 7 and to the print heads 4 which are formed of one or more rows of printing nozzles. The printing cylinder or jetting cylinder 7 has sheet-holding regions 8 and gaps 9 therebetween with grippers for holding the sheets 11. The cylinders 5, 7 are driven by one or more drives 6. The printing nozzles in the print heads 4 apply the ink to the sheets 11 to create the printed image 12. The sheet 11 is moved onwards, dried, and transported over the transfer cylinder 5 to a delivery 3.

Figure 3:
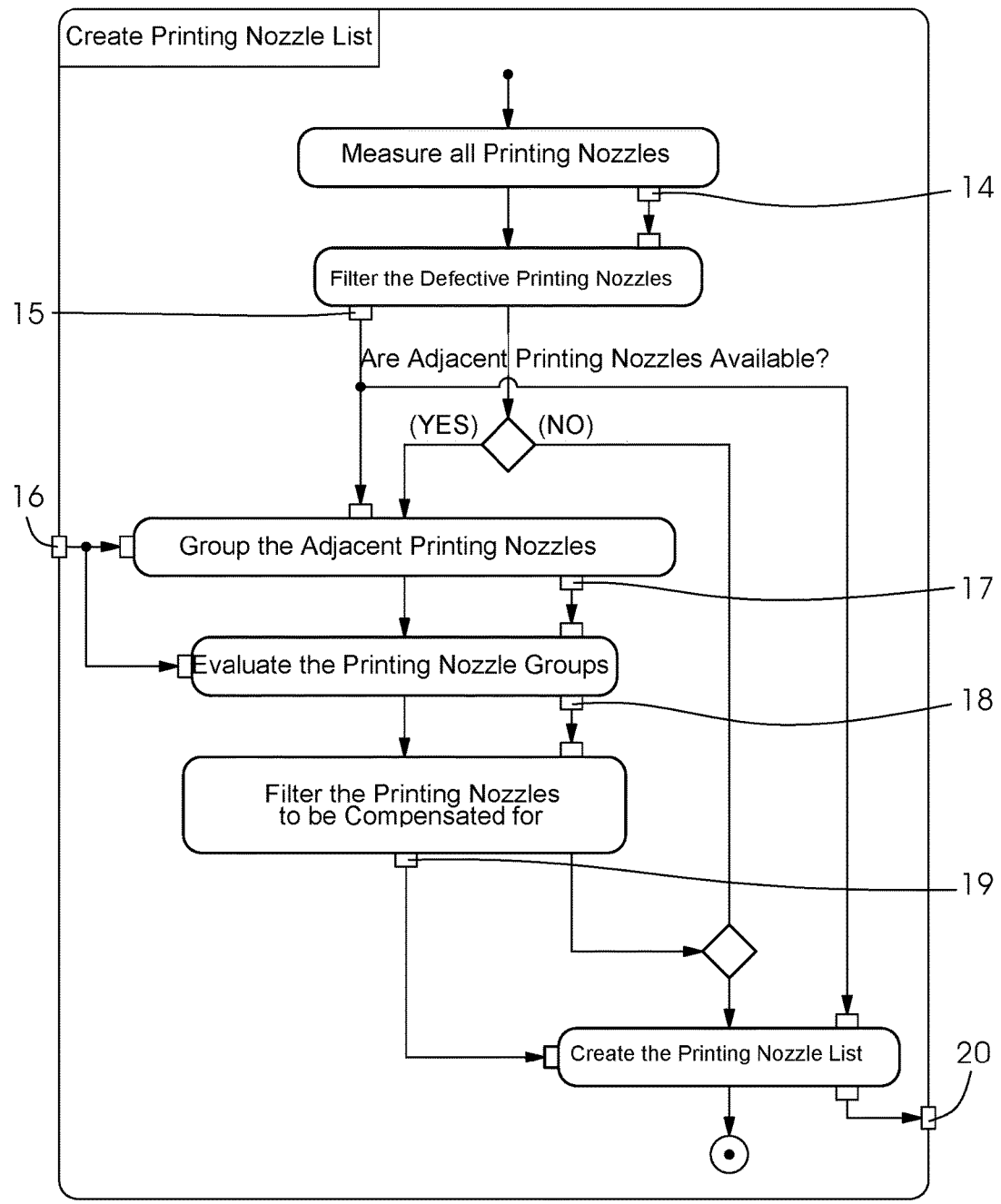
FIG. 3 is a flow chart of the method of the invention.

FIG. 3 is a flow chart of the method of the invention. In the method of the invention, the creation of a printing nozzle list is introduced between the traditional steps of detecting failed printing nozzles and compensating for the failed nozzles. A measuring system takes measurements of all nozzles in a print head 4 to detect the failed printing nozzles. For every printing nozzle, known prior art measuring systems indicate a deviation in μm from an ideal position and a value indicating the continuity of a line that has been printed. In addition, printing nozzles are marked as totally failed if they print below a defined threshold of visibility or not at all. The invention preferably makes use of data-optical measuring systems. A nozzle list 14 that has been created in this way is then subjected to the method of the invention for nozzle list processing. The processing of the nozzle list represents the method of the invention. Once the nozzle list has been processed, an updated remaining nozzle list 19 is used as a list of printing nozzles 20 to be compensated for in order to compensate the corresponding failed printing nozzles. Thus, the method of the invention is largely independent of the way in which the measured values are established and of the way in which the compensation is effected although it is to be understood that the compensation method needs to be based on the fundamental principle of compensation by adjacent printing nozzles.

In the method of the invention, which is carried out by the control computer 21 in a fully computerized way, the first step is to filter all defective printing nozzles out of the list of all measured printing nozzles 14. This means that all nozzles that have been found to exceed a defined threshold are deemed to be defective. In this case, "defective" may refer to a nozzle that has completely failed or to a nozzle that prints in a deviating way. All functioning printing nozzles are removed from the list. In a next step, all remaining printing nozzles in the list 15 are examined to find out whether the respective nozzle still has directly adjacent printing nozzles. If this is not the case, the nozzle is an individual or isolated defective nozzle which needs to be compensated for in any case, irrespective of whether it has failed or only deviates from the desired print result. In this case the nozzle in question remains on the list 15 and the next printing nozzle is examined. If the printing nozzle has immediate neighbors, however, it belongs to a group of defective printing nozzles. Such a group is formed, in accordance with a grouping rule in the form of a fixed table 16, resulting in a printing nozzle list 17 that includes grouped adjacent defective printing nozzles in addition to the isolated defective printing nozzles. The fixed table 16 shown below includes all possible combinations that may occur between failed printing nozzles and printing nozzles that print in a deviating way to the left and to the right.

2 Defective Printing Nozzles—1 Missing Nozzle and 1 Nozzle Spraying at an Angle

| Case | input | Output |
|---|---|---|
| 1.1 | M→ | X→ |
| 1.2 | →M | →X |
| 1.3 | M← | X← |
| 1.4 | ←M | ←X |

2 Defective Printing Nozzles—2 Nozzles that Spray at an Angle

| Case | input | Output |
|---|---|---|
| 2.1 | →→ | →X |
| 2.2 | →← | X← |
| 2.3 | ←→ | X→ |
| 2.4 | ←← | X← |

3 Defective Printing Nozzles

| case | input | output |
|---|---|---|
| 3.1 | →→→ | →→X |
| 3.2 | →→← | →X← |
| 3.3 | →←→ | X←→ |
| 3.4 | →←← | ←X← |
| 3.5 | ←→→ | ←→X |
| 3.6 | ←→← | ←→X |
| 3.7 | ←←→ | X←→ |
| 3.8 | ←←← | X←← |
| 3.9 | M→→ | X→→ |
| 3.10 | M→← | X→X |
| 3.11 | M←→ | X←X |
| 3.12 | M←← | X←X |
| 3.14 | →M→ | →X→ |
| 3.15 | →M← | →X← |
| 3.16 | ←M→ | ←X→ |
| 3.17 | ←M← | ←X← |
| 3.18 | →→M | X→X |
| 3.19 | →←M | X←X |
| 3.20 | ←→M | X→X |
| 3.21 | ←←M | X←X |
| 3.22 | MM→ | XX→ |
| 3.23 | MM← | XX← |
| 3.24 | M→M | X→X |
| 3.25 | M←M | X←X |
| 3.26 | →MM | →XX |
| 3.27 | ←MM | ←XX |

Explanation:
M—missing;
→—nozzle sprays to the right;
←—nozzle sprays to the left;
X—nozzle is compensated for The table 16 encompasses both the cases in which two defective printing nozzles are disposed next to one another and the case in which three defective printing nozzles are present. Then a suitable compensation rule is proposed as an output for every possible combination as an input variable. Possible output values for the individual printing nozzles are values that indicate that the printing nozzle needs to be compensated for or that it is used for compensation purposes, printing to the left or to the right. If a group of defective printing nozzles includes more than three defective printing nozzles, the group is subdivided into smaller sub-groups, each sub-group including two or three defective printing nozzles, and is then processed in a corresponding recursive way. In a case in which the group only is formed of failed printing nozzles and no printing nozzles that spray to the left or to the right, clearly no grouping rule is required. Instead, all failed nozzles are compensated for in the traditional way suggested by the prior art. Once this step has been completed, a printing nozzle list 18 includes grouped adjacent printing nozzles, which have been marked as to be compensated for or marked as functioning in accordance with the initial value of the fixed table 16.

If the grouping was done in accordance with the grouping rule, the printing nozzles that have not been marked as to be compensated for, i.e. the nozzles that are functioning printing nozzles, are removed. Thus, the printing nozzle list 19 now only contains printing nozzles that are too defective and need to be compensated for, i.e. the remaining isolated ones and the grouped printing nozzles. The resultant reduced printing nozzle list 20 will then be used for compensation. Since it contains many fewer printing nozzles to be compensated for than without the method of the invention and since the number has been reduced in particular in those difficult areas that include multiple defective nozzles located next to one another, the method of the invention results in a much more efficient compensation than the method that has previously been known in the art.

The following is a summary list of reference numerals and the corresponding structure used in the above description of the invention:

LIST OF REFERENCE SYMBOLS

T direction of transport
1 feeder
2 printing unit
3 delivery
4 inkjet heads
5 transfer cylinder
6 drive
7 printing cylinder (jetting cylinder)
8 sheet-holding region
9 gap
10 sheet-fed printing machine
11 sheet
12 printed image
13 white line
14 measured, complete printing nozzle list
15 printing nozzle list of defective printing nozzles
16 grouping rule—fixed table
17 printing nozzle list of grouped adjacent printing nozzles
18 printing nozzle list of marked adjacent printing nozzles
19 printing nozzle list of filtered compensating printing nozzles
20 complete printing nozzle list for compensation
21 control computer

The invention claimed is:

1. A method for compensating for failed printing nozzles in an inkjet printing machine, the method comprising the following steps:
    measuring all existing printing nozzles regarding print failure and deviation of a printed dot beyond a defined threshold, marking the printing nozzles as functioning, failed, or printing a dot deviating in a direction transverse to a printing direction, and saving measuring results on a computer in a nozzle list;
    using the computer to remove all functioning printing nozzles from the nozzle list;
    using the computer to mark all remaining isolated printing nozzles as failed printing nozzles;
    using the computer to group adjacent remaining printing nozzles, marking printing nozzles printing a dot deviating in a direction transverse to the printing direction as functioning printing nozzles contributing to a compensation or as failed printing nozzles in accordance with a grouping rule; and
    using the computer to compensate for all printing nozzles having been marked as failed by producing an increased ink drop volume of adjacent printing nozzles.

2. The method according to claim 1, which further comprises using printing nozzles printing a deviating print dot and printing at an angle along the printing direction to compensate for printing nozzles being adjacent along the printing direction and having been marked as failed printing nozzles.

3. The method according to claim 1, which further comprises grouping the adjacent remaining printing nozzles in accordance with a fixed table saved on the computer and used as the grouping rule.

4. The method according to claim 3, which further comprises providing the fixed table used as the grouping rule with all possible combinations for groups of both two and three printing nozzles printing at an angle transverse to and along the printing direction and printing nozzles having failed.

5. The method according to claim 4, which further comprises when groups of printing nozzles occur containing more than three printing nozzles printing at an angle in a direction transverse to or along the printing direction and printing nozzles having failed, subdividing the groups into smaller groups of two or three printing nozzles.

6. The method according to claim 3, which further comprises carrying out the step of measuring all existing printing nozzles by determining a value of a numerically established obliqueness, factoring the value in the fixed table or algorithm as the grouping rule and using the value to contribute to a decision made by the computer on how to group the adjacent remaining printing nozzles.

7. The method according to claim 6, which further comprises using the computer to vary a dot size of the printing nozzles as a function of a value of the numerically established obliqueness of the printing nozzles.

8. The method according to claim 4, which further comprises when groups of printing nozzles occur containing more than three printing nozzles printing at an angle in a direction transverse to or along the printing direction and printing nozzles having failed, creating and using new fixed tables for all possibly occurring combinations.

9. The method according to claim 1, which further comprises grouping the adjacent remaining printing nozzles in accordance with an algorithm implemented on the computer and used as the grouping rule.

* * * * *